United States Patent
Nix

(10) Patent No.: US 11,641,289 B1
(45) Date of Patent: May 2, 2023

(54) METHOD, APPARATUS AND SYSTEM FOR RETROFITTING A VEHICLE

(71) Applicant: Sucxess LLC, Birmingham, MI (US)

(72) Inventor: Axel Nix, Birmingham, MI (US)

(73) Assignee: Sucxess LLC, Birmingham, MI (US)

( * ) Notice: Subject to any disclaimer, the term of this patent is extended or adjusted under 35 U.S.C. 154(b) by 3 days.

(21) Appl. No.: 17/451,174

(22) Filed: Oct. 18, 2021

Related U.S. Application Data

(63) Continuation of application No. 16/658,364, filed on Oct. 21, 2019, now Pat. No. 11,153,116, which is a continuation of application No. 16/025,314, filed on Jul. 2, 2018, now Pat. No. 10,454,707, which is a continuation of application No. 15/442,640, filed on Feb. 25, 2017, now Pat. No. 10,027,505, which is a continuation of application No. 14/846,811, filed on Sep. 6, 2015, now Pat. No. 9,661,664, which is a
(Continued)

(51) Int. Cl.
| | |
|---|---|
| *H04L 12/40* | (2006.01) |
| *H04W 4/90* | (2018.01) |
| *H04W 76/50* | (2018.01) |
| *H04B 1/3822* | (2015.01) |
| *B60R 21/01* | (2006.01) |
| *B60T 7/12* | (2006.01) |
| *G06F 13/42* | (2006.01) |
| *B60R 21/00* | (2006.01) |

(52) U.S. Cl.
CPC ........ *H04L 12/40169* (2013.01); *B60R 21/01* (2013.01); *B60T 7/12* (2013.01); *G06F 13/4282* (2013.01); *H04B 1/3822* (2013.01); *H04L 12/40* (2013.01); *H04W 4/90* (2018.02); *H04W 76/50* (2018.02); *B60R 2021/0027* (2013.01); *H04L 2012/40215* (2013.01); *H04L 2012/40273* (2013.01)

(58) Field of Classification Search
CPC ...... H04W 4/90; H04W 76/50; H04B 1/3822; H04L 12/40; H04L 12/40169; H04L 2012/40215; H04L 2012/40273; B60T 7/12; G06F 13/4282; B60R 21/01; B60R 2021/0027
See application file for complete search history.

(56) References Cited

U.S. PATENT DOCUMENTS

| 5,311,197 A | 5/1994 | Sorden et al. |
| 5,572,204 A | 11/1996 | Timm et al. |

(Continued)

OTHER PUBLICATIONS

Audiotechnik Dietz Vertriebs-GmbH, "Installation / connection manual for multimedia interface 1280".
(Continued)

*Primary Examiner* — Congvan Tran
(74) *Attorney, Agent, or Firm* — Smartpat PLC

(57) ABSTRACT

A system, apparatus, and method for retrofitting a vehicle are presented. The method relates to a vehicle with a factory-installed first apparatus which communicates with a factory-installed second apparatus through a vehicle data bus using a first message. The method includes electrically disconnecting the vehicle data bus between the first apparatus and the second apparatus and electrically connecting a retrofit apparatus to the vehicle data bus. The method further includes transmitting a second message from the retrofit apparatus to the first apparatus which is indistinguishable from the first message.

20 Claims, 7 Drawing Sheets

Related U.S. Application Data continuation of application No. 11/742,574, filed on Apr. 30, 2007, now Pat. No. 9,161,195.

(56) References Cited

U.S. PATENT DOCUMENTS

| | | | |
|---|---|---|---|
| 6,028,537 A | 2/2000 | Suman et al. | |
| 6,151,551 A | 11/2000 | Geier et al. | |
| 6,330,499 B1 | 12/2001 | Chou et al. | |
| 6,493,629 B1 | 12/2002 | Bosch | |
| 6,535,743 B1 | 3/2003 | Kennedy, I et al. | |
| 6,617,979 B2 | 9/2003 | Yoshioka | |
| 6,647,328 B2 | 11/2003 | Walker | |
| 6,665,601 B1 | 12/2003 | Nielsen | |
| 6,687,497 B1 | 2/2004 | Parvulescu et al. | |
| 6,690,302 B1 | 2/2004 | Inomata | |
| 6,748,211 B1 | 6/2004 | Isaac et al. | |
| 6,812,832 B2 | 11/2004 | Lobaza et al. | |
| 7,016,656 B2 | 3/2006 | Odashima et al. | |
| 7,129,826 B2 | 10/2006 | Nitz et al. | |
| 7,206,672 B2 | 4/2007 | Mueller | |
| 7,398,082 B2 | 7/2008 | Schwinke et al. | |
| 7,737,831 B2 | 6/2010 | Munoz | |
| 2002/0022489 A1 | 2/2002 | Odashima et al. | |
| 2002/0046285 A1 | 4/2002 | Yasushi et al. | |
| 2002/0103622 A1 | 8/2002 | Burge | |
| 2002/0115423 A1 | 8/2002 | Hatae et al. | |
| 2004/0091085 A1 | 5/2004 | Suganuma et al. | |
| 2004/0198466 A1 | 10/2004 | Walby et al. | |
| 2004/0233045 A1 | 11/2004 | Mays | |
| 2004/0249526 A1* | 12/2004 | Hauer | G08C 17/00 701/32.7 |
| 2004/0260458 A1 | 12/2004 | Park et al. | |
| 2005/0060066 A1 | 3/2005 | Buehler et al. | |
| 2005/0222718 A1* | 10/2005 | Lazarz | G06F 21/34 701/1 |
| 2005/0258312 A1* | 11/2005 | Rose | H02J 4/00 246/4 |
| 2006/0017612 A1 | 1/2006 | Nagatani | |
| 2006/0136291 A1 | 6/2006 | Morita et al. | |
| 2006/0220806 A1 | 10/2006 | Nguyen | |
| 2007/0016342 A1 | 1/2007 | Allen et al. | |
| 2007/0075919 A1 | 4/2007 | Breed | |
| 2007/0085815 A1 | 4/2007 | Oesterling et al. | |
| 2007/0086579 A1 | 4/2007 | Lorello et al. | |
| 2007/0112476 A1 | 5/2007 | Obradovich | |
| 2007/0142028 A1 | 6/2007 | Ayoub et al. | |
| 2007/0174467 A1 | 7/2007 | Ballou et al. | |
| 2007/0207772 A1 | 9/2007 | Huber et al. | |
| 2007/0298765 A1 | 12/2007 | Dickinson et al. | |
| 2008/0042817 A1* | 2/2008 | Fogelstrom | B60C 23/009 340/442 |
| 2008/0093150 A1 | 4/2008 | Schramm et al. | |
| 2008/0102785 A1 | 5/2008 | Childress et al. | |
| 2008/0143497 A1 | 6/2008 | Wasson et al. | |
| 2008/0162042 A1 | 7/2008 | Huber et al. | |
| 2009/0030561 A1* | 1/2009 | Gurieff | B60T 8/1755 701/1 |
| 2013/0159586 A1 | 6/2013 | Kessler | |
| 2020/0269781 A1* | 8/2020 | Putz | H04L 67/125 |

OTHER PUBLICATIONS

Dataspeed Inc., Petition for Inter Partes Review of U.S. Pat. No. 10,027,505.

Dataspeed Inc., Petition for Inter Partes Review of U.S. Pat. No. 10,454,707.

Dataspeed Inc., Petition for Inter Partes Review of U.S. Pat. No. 9,871,671.

Ford Motor Company, Mobile radio Installation Guidelines, Mar. 4, 1998.

Joachim Schröder, Udo Müller, Rüdiger Dillmann, "Smart Roadster Project: Setting up Drive-by-Wire or How to Remote-Control your Car," Intelligent Autonomous Systems 9—IAS-9 (Feb. 2006).

Joachim Schröder, Udo Müller, Rüdiger Dillmann, "Smart Roadster Project: Setting up Drive-by-Wire or How to Remote-Control your Car," Conference Paper (Jan. 2006).

Johansson, "Vehicle Applications Of Controller Area Network", Handbook of Networked and Embedded Control Systems, 2005, pp. 741-765.

Microchip—MCP2502X/5X "CAN I/O Expander Family" Datasheet.

Negley, "Getting Control Through CAN," Sensors, Oct. 2000, vol. 17, #10.

PTAB, Paper 24, Decision IPR2020-00268, Jun. 15, 2021.

PTAB, Paper 25, Decision IPR2020-00147, May 10, 2021.

PTAB, Paper 27, Decision IPR2020-00116, May 4, 2021.

Robert Bosch GmbH, "CAN Specification, Version 2.0".

Szydlowski, "A Gateway For CAN Specification 2.0 Non-Passive Devices", SAE Technical Paper Series, 930005, Mar. 1-5, 1993.

Taube et al., "Comparison of CAN Gateway Module For Automotive And Industrial Control Apparatus", CAN In Automation 2005.

* cited by examiner

METHOD, APPARATUS AND SYSTEM FOR RETROFITTING A VEHICLE

TECHNICAL FIELD

The present disclosure relates to a method, apparatus and system for retrofitting a vehicle.

BACKGROUND OF THE INVENTION

Being able to easily alert emergency responders in case of an automobile accident is highly desirable. Mobile application service providers (such as OnStar®) address this need for their subscribers by offering an emergency call button located within reach of the driver of an automobile. Upon pressing the emergency call button an emergency telephone call is placed from a cellular telephone which is embedded in the vehicle through a wireless telecommunication network and a public switched telephone network to a service center operated by the mobile application service provider. An emergency call to the service provider may also be initiated automatically, e.g. upon airbag deployment.

In case of an incoming emergency call the mobile application service center silently obtains vehicle position information, e.g. information from a GPS receiver that is also embedded in the vehicle. The mobile application service center as part of an emergency assistance service informs public safety authorities of the emergency and conveys the vehicle's position. The emergency assistance service is typically available only to those who register (for a fee) with the mobile application service provider. Registration with the mobile application service providers includes an underlying registration with the wireless telecommunication network. Several elements of one such system are described in U.S. Pat. No. 6,812,832 (Lobaza), which is hereby incorporated by reference.

The embedded cellular telephone may also be used to place hands free telephone calls. Dialing the embedded cellular telephone may utilize a speech recognition engine that is capable of recognizing spoken telephone numbers or voice tags associated with telephone numbers. To facilitate dialing the embedded cellular telephone may also be connected to an external keypad, e.g. a telephone-style keypad located in the vehicle's dashboard or a virtual keypad displayed on a touch screen display. The external keypad may communicate with the embedded cellular telephone by sending a telephone dial command message through the vehicle communication network. The embedded cellular telephone is accordingly configured to receive telephone dial command messages on the vehicle communication network and establish a telephone call to the requested telephone number.

US law obligates commercial mobile radio service providers to transmit all wireless 911 emergency calls without respect to their call validation process to a Public Safety Answering Point (PSAP), or, where no Public Safety Answering Point has been designated, to a designated statewide default answering point or appropriate local emergency authority. The law extends to voice capable cellular telephones embedded in vehicles. An embedded cellular telephone can hence be used in an emergency to directly alert public safety authorities by dialing 911 regardless of registration status with the mobile application service provider or the underlying wireless telecommunication network. However, the user interface provided to dial 911 is inferior to single button activation and may e.g. require use of the voice recognition interface. Changes in an operator's voice during an emergency frequently cause the voice recognition engine to fail detecting a spoken "dial 9-1-1" command and thereby preclude the operator from receiving the help he is seeking.

What is therefore needed is a method for combining the benefits of legally mandated free wireless 911 access to a Public Safety Answering Point with the advantageous single button user interface for placing emergency calls to a mobile application service center.

SUMMARY OF THE INVENTION

In one aspect of the present invention an integrated vehicle communication system includes a telecommunication apparatus in communication with a vehicle data bus. An emergency call apparatus is also in communication with the vehicle data bus, the emergency call apparatus further providing an emergency call push button switch to initiate an emergency telephone call to a Public Safety Answering Point. When the emergency call push button switch is pressed the emergency call apparatus transmits a telephone dial command message including a telephone number to be dialed on the vehicle data bus. The telecommunication apparatus is configured to receive the telephone dial command and establish communication with the requested telephone number. To initiate an emergency call to a Public Safety Answering Point in the United States the emergency call apparatus may e.g. transmit a telephone dial command message requesting the telecommunication apparatus to dial "911".

In a further aspect the emergency call apparatus may include an input for an external switch. In this aspect the emergency call push button switch may be remote from the emergency call apparatus and may e.g. be located within reach of the driver of the vehicle whereas the emergency call apparatus may be located somewhere else hidden in the vehicle.

In another aspect the emergency call apparatus may be added to the vehicle during a retrofit. In this aspect the vehicle may be originally equipped with an embedded telecommunication apparatus and an emergency call push button switch connected thereto. Before the retrofit pressing the emergency call button is detected by the telecommunication apparatus which responsive to the button press initiates an emergency call to a mobile application service center.

During the retrofit an emergency call apparatus is added to the vehicle. The electrical connection between the emergency call push button switch and the telecommunication apparatus is separated and the emergency call push button switch is rewired and connected to the emergency call apparatus.

After the retrofit pressing the emergency call push button is detected by the emergency call apparatus which responsive to the button press transmits a telephone dial command message on the vehicle data bus. The telephone dial command message may request the telecommunication apparatus to dial the telephone number 911. The telecommunication apparatus responsive to receiving the telephone dial command message establishes a voice call to a Public Safety Answering Point.

In yet another aspect the emergency call apparatus may be configured to detect a trigger condition and responsive thereto request the telecommunication apparatus to establish communication with a Public Safety Answering Point. The trigger condition may be a manual emergency call push button press. As part of an automatic emergency calling system the trigger condition may also be the receipt of one or more messages on the vehicle data bus which are reflective of a vehicle accident, e.g. a message signaling airbag deployment. Upon detecting a trigger condition the emergency call apparatus may transmit a telephone dial command message on the vehicle data bus requesting the telecommunication apparatus to dial 911. The telecommunication apparatus responsive to receiving the telephone dial command message establishes a voice call to a Public Safety Answering Point.

In still another aspect the emergency call apparatus may provide an electrically controlled switch to separate the vehicle communication network into two subnets. One subnet may be used to communicate between the emergency call apparatus and the telecommunication device and the other subnet may be used to communicate between the emergency call apparatus and the rest of the vehicle. This aspect can compensate for possible loss of communication on the vehicle data bus after a vehicle crash, e.g. because a wire within the communication network is shorted to ground or battery as a result of the crash. The emergency call apparatus may be configured to detect loss of communication and responsive thereto open the electrically controlled switch, thereby dividing the communication network into the two electrically insulated subnets. In result the emergency call apparatus separates the damaged portion of the vehicle communication network from its connection to the telecommunication apparatus and thereby regains its ability to communicate with the telecommunication apparatus and initiate an emergency call even though communication with the rest of the vehicle is no longer possible.

In yet another aspect the emergency call apparatus may provide two vehicle data bus interfaces wherein the first interface is used to communicate with the telecommunication apparatus and the second interface is used to communicate with the rest of the vehicle. In this aspect the emergency call apparatus acts as a bi-directional gateway between the two vehicle data bus interfaces. Messages which the emergency call apparatus receives through the first vehicle data bus interface are retransmitted through the second vehicle data bus interface. Vice versa messages received through the second vehicle data bus interface are retransmitted through the first vehicle data bus interface. The two vehicle data bus interfaces are electrically insulated from each other such that the emergency call apparatus maintains its ability to communicate with the telecommunication apparatus even if communication with the rest of the vehicle can not be established, e.g. because a communication bus wire is shorted to ground or battery as may happen during an accident.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
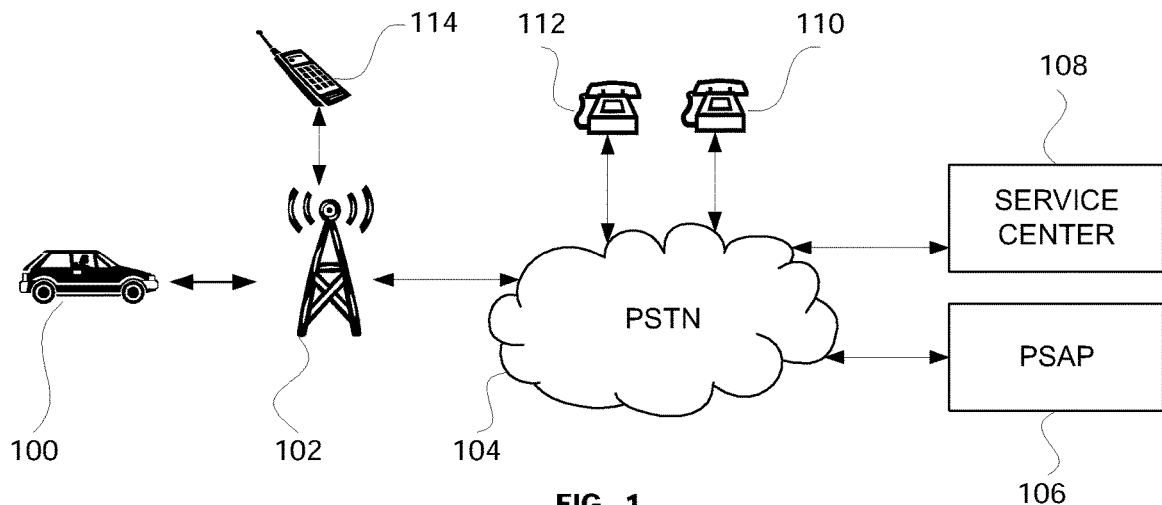
FIG. 1 is a schematic diagram of an exemplary wireless and a public switched telecommunication network through which emergency calls can be placed from a vehicle to a service center or Public Safety Answering Point.

Referring to FIG. 1, there is shown a vehicle 100 featuring a mobile telecommunication apparatus, suitable for use with an embodiment of the invention, and which may be installed in the vehicle or carried into the vehicle by the subscriber. The mobile telecommunication apparatus communicates through a wireless network 102, symbolized by a local telecommunication antenna tower, with a public switched telephone network (PSTN) 104, to which are also connected telephones 110 and 112. Wireless network 102 may also communicate with other wireless telecommunication devices, here symbolized by a wireless telephone 114. The mobile telecommunication apparatus in vehicle 100, which will be described in more detail with reference to FIG. 2A, may include a cellular telephone or any other wireless device that may be registered with a cellular service provider providing general dialing capability in connection with, and operation through, PSTN 104. It may also include a cellular telephone or other wireless device that is not or that is no longer registered with a cellular service provider so long as it provides connection with and operation through PSTN 104 with a Public Safety Answering Point (PSAP) 106.

The telecommunication apparatus carried in vehicle 100 may have been designed to provide access to mobile application services of a service provider such as, for example, OnStar®. Mobile application services are typically provided within a subscription business model, which requires payment of a subscription fee per period, e.g. $19.95 per month or $199 per year. The telecommunication apparatus may have been permanently installed in the vehicle at the time of vehicle assembly and the cost of the telecommunication apparatus may have been subsidized by the service provider in anticipation of future subscription revenue if the owner or lessor of vehicle 100 registers for mobile application services. The service provider generally maintains at least one service center 108, which is connected to PSTN 104 and which the subscriber and other subscribers in other vehicles call for the mobile application services. The mobile application services may include, for example, requests for vehicle location, selection of specific points of interest and directions thereto, and emergency assistance (both requested and automatic), as well as others not named.

If the owner or lessor of vehicle 100 does not register with the service provider, e.g. to avoid the financial burden associated with a subscription, the service provider may refuse to provide mobile application services including emergency assistance. The mobile application service provider may also deactivate the telecommunication apparatus located within vehicle 100. Deactivating the telecommunication apparatus may include deregistering the cellular telephone therein from wireless network 102 so that the telecommunication apparatus can no longer gain access to wireless network 102 for general dialing and can thus no longer connect to service center 108.

Even if the telecommunication apparatus within vehicle 100 has been deactivated and the cellular telephone therein been deregistered from wireless network 102 both can still be used to establish a connection to a Public Safety Answering Point (PSAP). Connecting to a PSAP is independent of a subscription with the service provider or the underlying wireless network 102. This is, especially in the United States, to comply with federal law mandating free access to a PSAP for all devices used to access a commercial mobile radio service (CMRS).

Figure 2A:
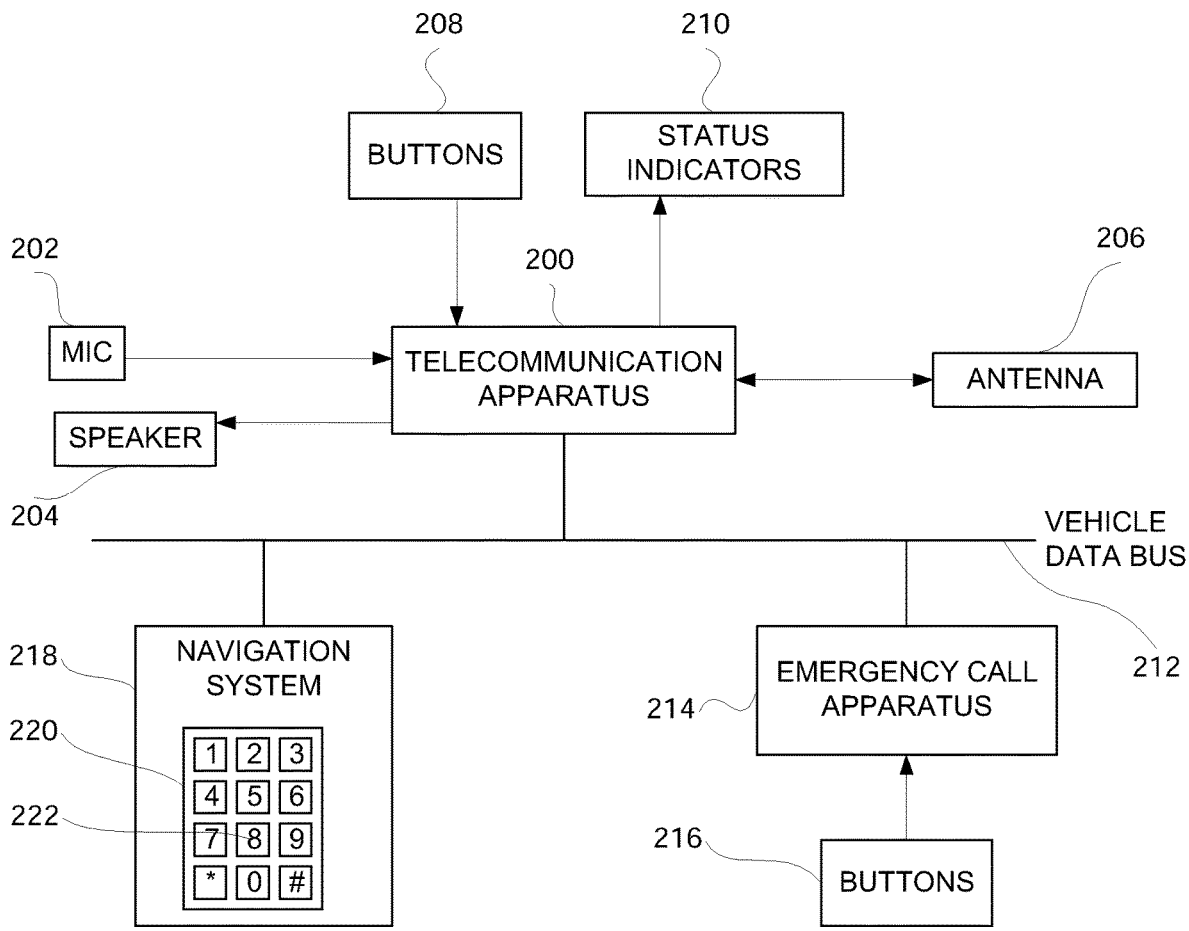
FIG. 2A is a block diagram illustrating the vehicle portion of a wireless communication system for placing emergency calls used in the vehicle of FIG. 1.

Referring now to FIG. 2A there is shown wireless telecommunication apparatus 200 in vehicle 100. The telecommunication apparatus 200 communicates voice and data through an antenna 206 with wireless network 102 and through wireless network 102 with public switched telephone network 104. The telecommunication apparatus 200 may provide "hands-free" voice communication through a microphone 202 and speaker 204. The telecommunication apparatus may include a GPS or similar navigation apparatus (not shown) which receives signals through a GPS antenna (not shown) from global positioning satellites and derives therefrom position data (e.g., the longitude and latitude and/or the speed and heading) of the apparatus. The telecommunication apparatus 200 may convert the GPS position information into a transmissible form for subsequent transmission from vehicle 100 to service center 108 or Public Safety Answering Point 106. Communication between the telecommunication apparatus 200 and service center 108 or PSAP 106 may be voice communication utilizing microphone 202 and speaker 204 and/or data communication the data comprising e.g. GPS location information.

Connected to the telecommunication apparatus 200 are one or more buttons 208 and status indicator 210. Buttons 208 provide a simple user interface for an operator, e.g. the driver or passenger in vehicle 100, to interact with the telecommunication apparatus 200. The buttons 208 may e.g. include a dedicated emergency call button. If the emergency call button is pressed telecommunication apparatus 200 establishes voice and/or data communication with service center 108. Status indicator 210, which may e.g. be one or more light emitting diodes or any other form of display, provides feedback to the vehicle operator as to the status of the telecommunication apparatus 200. Telecommunication apparatus 200 is also connected to vehicle data bus 212 to exchange messages with other electronic modules within vehicle 100 as required.

Telecommunication apparatus 200 may provide general dialing capability, e.g. to a telephone 110, 112 within the public switched telephone network 104 or to a wireless telephone 114 through wireless network 102 or any other wireless network. To facilitate dialing telecommunication apparatus 200 may include a voice recognition and activation apparatus, which responds to predetermined spoken data via microphone 202 to perform predetermined functions. It accesses a plurality of voice models stored within telecommunication apparatus 200. Each voice model includes data permitting recognition of a spoken word or phrase. The voice recognition apparatus compares received spoken data with the voice models in order to recognize those words and phrases which are defined and for performing predetermined actions in response thereto. Some voice models represent commands, such as "menu," "store," "dial," "call," etc. Other voice models represent the digits required for telephone dialing: "one," "two," etc. For example, the apparatus may be programmed to recognize the phrase "Dial 9-1-1 Dial" and respond by placing a call to a Public Safety Answering Point. General dialing capability may be initiated by the word "Dial" followed by the number, digit by digit.

Telecommunication apparatus 200 may also be configured to allow dialing utilizing a keypad which may be connected directly to communication apparatus 200 or indirectly connected to another module which communicates with telecommunication apparatus 200 through the vehicle data bus 212. In an exemplary embodiment navigation system 218 comprises a touch screen display 220 which displays a virtual telephone keypad 222. An operator may enter a telephone number he wishes to dial on the virtual keypad 222. After the telephone number has been entered navigation system 218 transmits a telephone dial command message on the vehicle data bus 212 including the telephone number to be dialed. Telecommunication apparatus 200 responsive to receiving the telephone dial command message establishes voice and/or data communication with the desired telephone number.

Quicker and easier access to dialing 911 and establishing voice and/or data communication with a Public Safety Answering Point is provided by emergency call apparatus 214, which is connected to vehicle data bus 212 and to one or more buttons 216. Buttons 216 may include an emergency call push button switch which when pressed causes emergency call apparatus 214 to transmit a telephone dial command message including a telephone number to be dialed on vehicle data bus 212. Telecommunication apparatus 200 responsive to receiving the telephone dial command message establishes voice communication with the requested telephone number, e.g. 911. Emergency call apparatus 214 and its operation are described in more detail with reference to FIGS. 5 through 9 below.

Figure 2B:
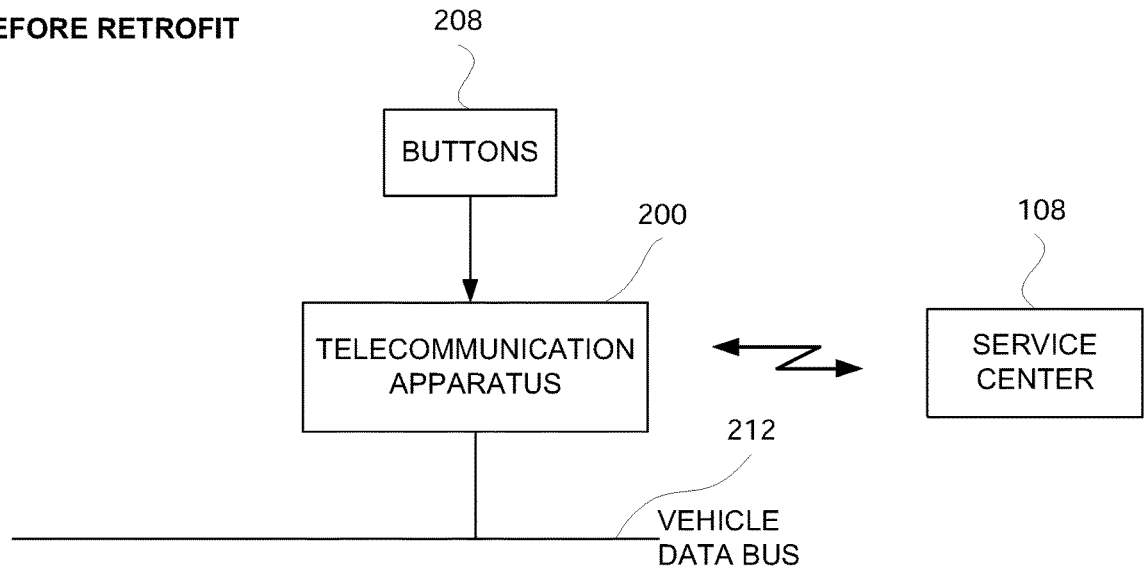
FIG. 2B is a block diagram showing aspects of a prior art vehicle communication system for communicating with a mobile application service center before retrofit with an emergency call apparatus.

As is shown in FIG. 2B vehicles equipped with an embedded telecommunication apparatus 200 are typically also equipped with buttons 208, one of which may be an emergency call button to initiate an emergency call to service center 108. Buttons 208 and telecommunication apparatus 200 do not serve any useful purpose if the owner or lessor of vehicle 100 does not register with the mobile application service provider. The existing buttons 208 and the telecommunication apparatus 200 may however be used when retrofitting vehicle 100 with an emergency call apparatus 214 at some time after vehicle built.

Figure 2C:
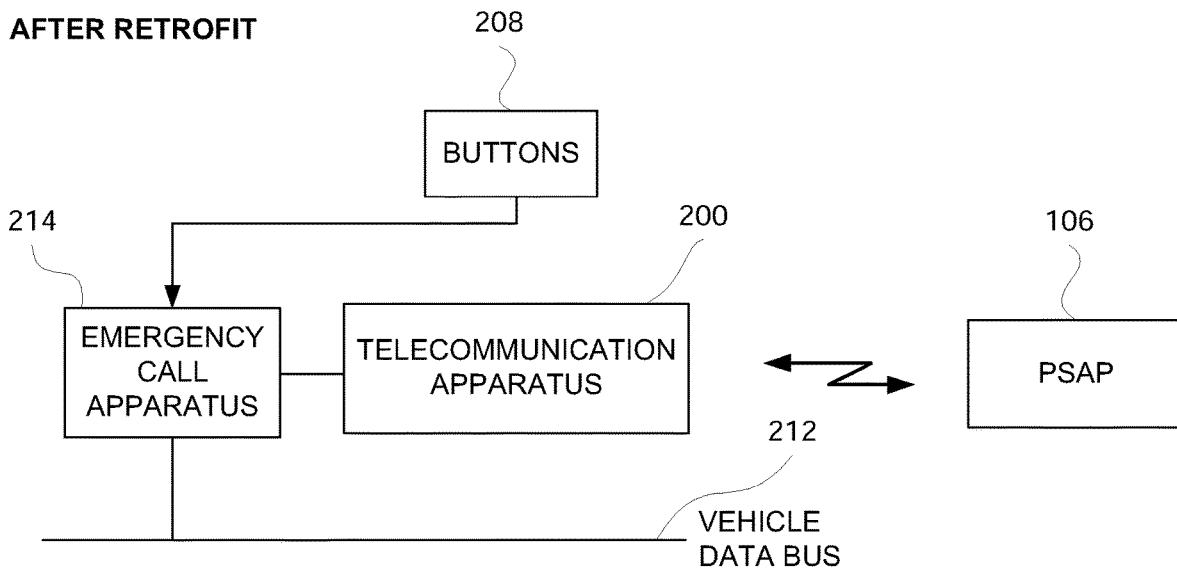
FIG. 2C is a block diagram showing aspects of a vehicle communication system for communicating with a Public Safety Answering Point after retrofit with an emergency call apparatus.

An exemplary method of retrofitting vehicle 100 is show in FIG. 2C. Vehicle 100 is retrofitted by adding emergency call apparatus 214. The electrical connection between buttons 208 and telecommunication apparatus 200 is removed and instead buttons 208 are rewired and connected to emergency call apparatus 214. Optionally the vehicle data bus connection between telecommunication apparatus 200 and vehicle data bus 212 may be disconnected and instead re-routed into the emergency call apparatus 214. A new connection is made between the emergency call apparatus 214 and vehicle data bus 212. Further, emergency call apparatus 214 is connected to vehicle battery and vehicle ground to power emergency call apparatus 214.

To enable the rewiring of buttons 208 the electrical interface between buttons 216 and emergency call apparatus 214 may be identical to the electrical interface between buttons 208 and telecommunication apparatus 200. Using an identical interface, e.g. the same resistor values in case of resistor coded switches, provides that an emergency call button 208 which is connected to and used in combination with telecommunication apparatus 200 before the retrofit can be rewired and used in combination with emergency call apparatus 214 after the retrofit. This simplifies the process of retrofitting vehicle 100 which may have originally been equipped with telecommunication apparatus 200 and buttons 208 but not emergency call apparatus 214 and buttons 216.

Figure 3:
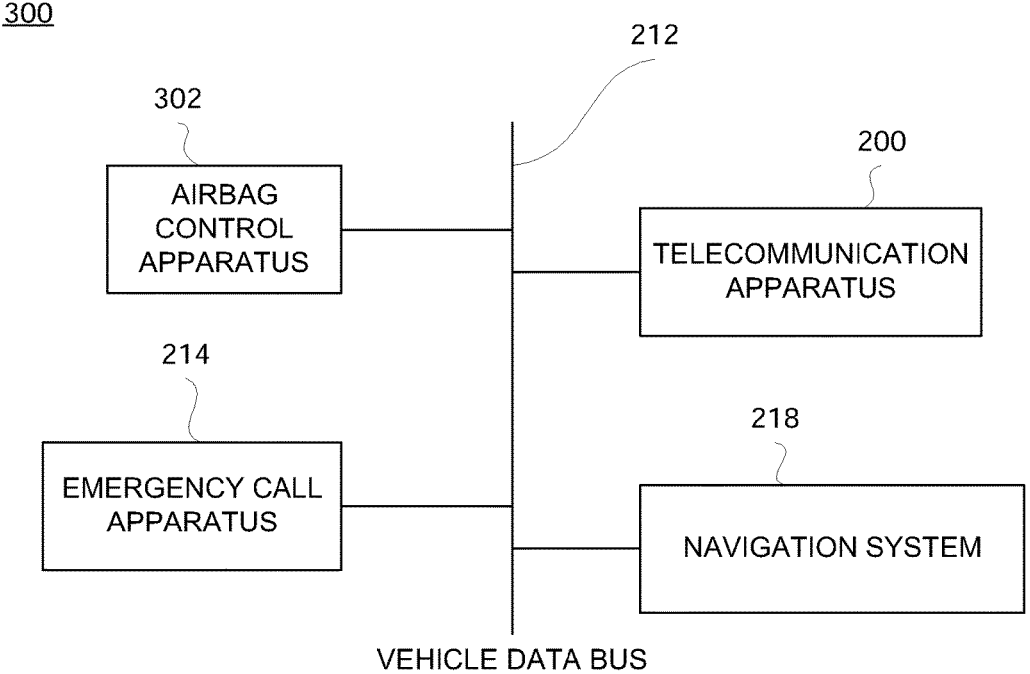
FIG. 3 is a block diagram illustrating a vehicle communication system showing an airbag control apparatus, a telecommunication apparatus, an emergency call apparatus and a navigation system communicating through a common vehicle data bus.

Referring now to FIG. 3, there is shown a block diagram illustrating an exemplary vehicle communication system 300 including the telecommunication apparatus 200, an airbag control apparatus 302, the emergency call apparatus 214 and the navigation system 218. As is shown, each system is in communication with the vehicle's data bus 212, which may be a Class 2 or CAN vehicle data bus or any other suitable bus known in the art for electronic data communication.

Figure 4:
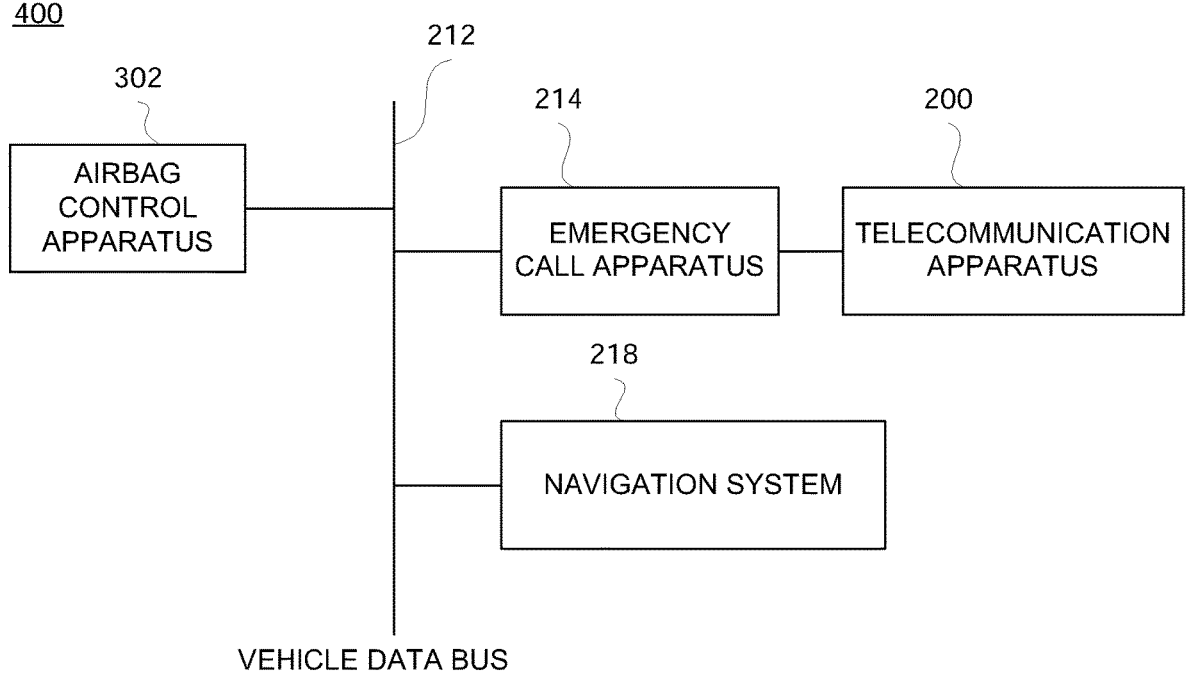
FIG. 4 is a block diagram illustrating an alternative embodiment of a vehicle communication system in which the telecommunication apparatus is connected to the vehicle data bus through the emergency call apparatus.

FIG. 4 illustrates an alternative embodiment of the vehicle communication system 400. In this embodiment telecommunication apparatus 200 is in communication with vehicle data bus 212 using an indirect connection made trough emergency call apparatus 214, as will be explained in more detail with respect to FIG. 6 and FIG. 7.

Figure 5:
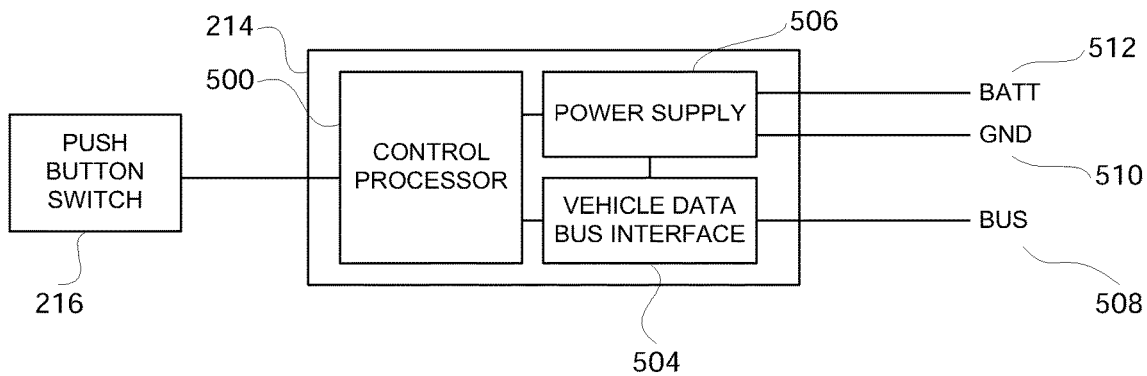
FIG. 5 is a block diagram illustrating an exemplary embodiment of an emergency call apparatus for a vehicle communication system configuration as shown in FIG. 3.

FIG. 5 is a block diagram illustrating an exemplary emergency call apparatus 214. Control processor 500, which may take the form of a programmed digital computer or a custom digital processor, is operatively connected to push button switch 216. Push button switch 216 may be an emergency call button located within easy reach of the driver and labeled prominently, e.g. with a Red Cross icon or the letters "SOS". Push button switch 216 is designed to be easily found and operated by the driver or passenger of vehicle 100 even under stress. Push button switch 216 may be any suitable device that translates a human operator's intention into a signal that can be detected by control processor 500, including e.g. a momentary push button switch, a toggle switch, a rocker switch, a rotary switch or a virtual button on a touch screen display. Control processor 500 is connected to the vehicle data bus 212 through a vehicle data bus interface 504 using an electrical terminal 508. Control processor 500 and vehicle data bus interface 504 are powered by power supply 506. Power supply 506 is connected to the vehicle's power distribution system through vehicle battery terminal 512 and vehicle ground terminal 510. While emergency call apparatus 214 is shown as a stand alone unit it should be appreciated that it may also be integrated within another electronic control module in which case control processor 500, power supply 506 and vehicle data bus interface 504 may be shared with other functions.

Figure 6:
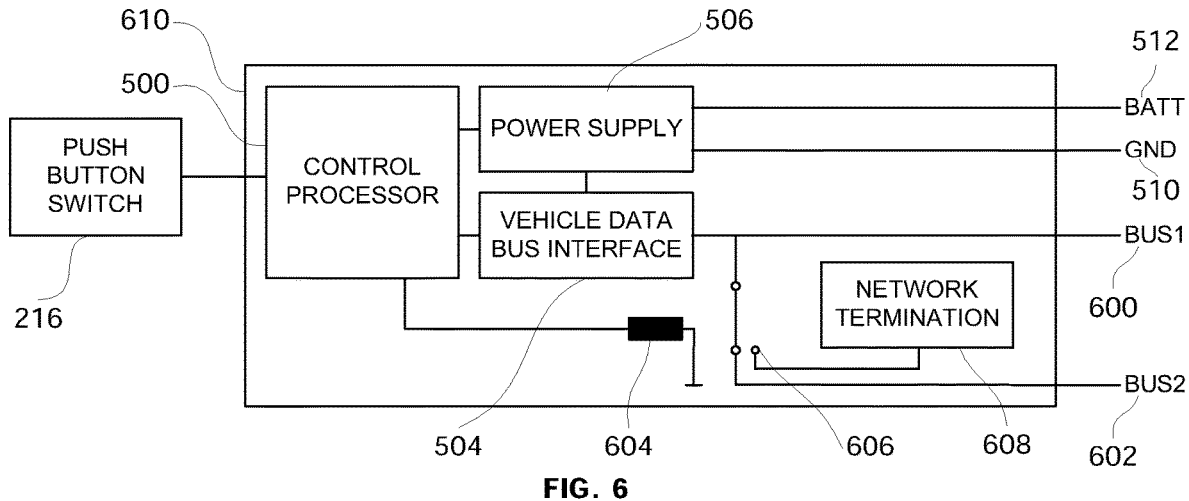
FIG. 6 is a block diagram illustrating an exemplary embodiment of an emergency call apparatus for a vehicle communication system configuration as shown in FIG. 4.

FIG. 6 is an alternative embodiment showing an emergency call apparatus 610 which may be used in the vehicle communication system 400 shown in FIG. 4. In this example the telecommunication apparatus 200 is connected to the vehicle data bus 212 indirectly through emergency call apparatus 610. Electrical terminal 600 connects the emergency call apparatus 610 to the telecommunication communication apparatus 200. Electrical terminal 602 connects the emergency call apparatus 610 to vehicle data bus 212 and through that to all other electronic modules communicating through vehicle data bus 212. Control processor 500 electronically controls switch 606, which may e.g. be an electromechanical relay with coil 604, or any other suitable switching device. Switch 606 is normally closed, creating a short circuit between electrical terminals 600 and 602. In case of a crash the vehicle communication system 400 may be damaged, e.g. may deformation to the vehicle's sheet metal have caused a wire of vehicle data bus 212 to be shortened to vehicle ground or battery, making communication on vehicle data bus 212 impossible. Control processor 500 is configured to detect such damage to the communication system by monitoring its vehicle data bus interface 504. If damage to the communication system is detected control processor 500 restores communication with the telecommunication device 200 by opening switch 606 and thereby disconnecting the damaged part of the vehicle communication system 400 from vehicle data bus interface 504. In its open position switch 606 may cause vehicle data bus interface 504 to be connected to a network termination element 608, simulating a network termination usually present in the now disconnected vehicle communication system. Network termination may consist of a pull-up or pull-down resistor or any other electronic circuit known in the art of electronic communication for terminating communication networks.

Figure 7:
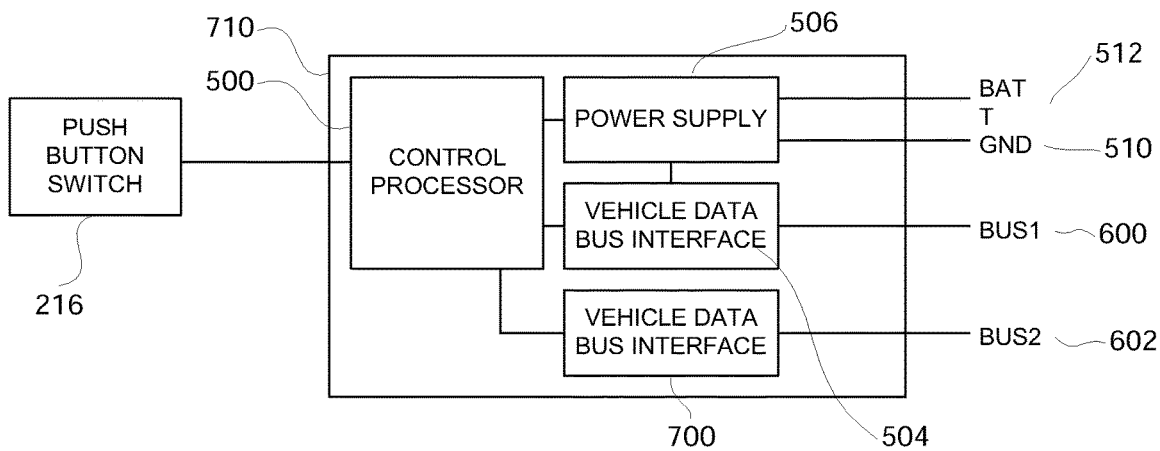
FIG. 7 is a block diagram of an alternative embodiment of the emergency call apparatus show in FIG. 6.

FIG. 7 shows another alternative embodiment of emergency call apparatus 710. In this example control processor 500 communicates with telecommunication apparatus 200 through vehicle data bus interface 504 and electrical terminal 600. It is also communicates with other electronic modules connected to the vehicle data bus 212 through a second vehicle data bus interface 700 and electrical terminal 602. Vehicle data bus interface 504 and vehicle data bus 700 are electrically insulated from each other so that damage to the vehicle data bus 212 does not affect the ability of control processor 500 to communicate with the telecommunication device 200 through vehicle data bus interface 504. During normal operation control processor 500 is configured to act as bidirectional gateway between vehicle data bus interface 504 and vehicle data bus 700. Control processor 500 re-transmits any messages it receives from vehicle data bus interface 504 through vehicle data bus interface 700 and any messages it receives from vehicle data bus interface 700 through vehicle data bus interface 504, thereby functionally connecting telecommunication apparatus 200 with vehicle data bus 212.

Figure 8:
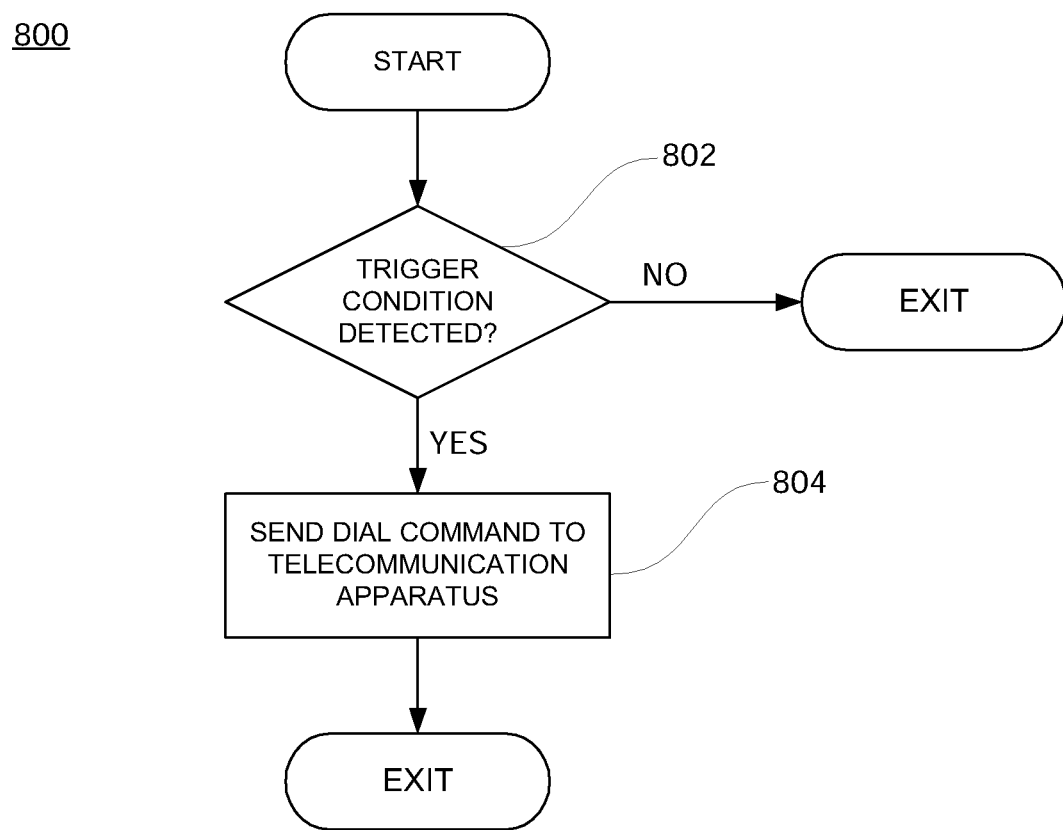
FIG. 8 is a flow diagram illustrating an exemplary method for initiating an emergency call.

FIG. 8 is a flow diagram illustrating an exemplary method 800 that may be implemented in process controller 500. Process controller 500 is configured to detect a trigger condition in block 802. The trigger condition may be a manual operator request to initiate an emergency call, e.g. by pressing emergency call push button switch 216. The trigger condition may also be the receipt of a predetermined message or a combination of predetermined messages on vehicle data bus 212. The predetermined message or messages may e.g. reflect that the airbag control apparatus 302 has inflated an airbag in vehicle 100. Other suitable messages that may act as a trigger for automatic emergency calling include a message from an object detection apparatus indicating that vehicle 100 was involved in a collision, a message indicating vehicle deceleration above a predetermined threshold or any other message or combination of messages which indicate that vehicle 100 was involved in a severe accident which may have caused the occupants within vehicle 100 to be injured and no longer be able to manually initiate an emergency call.

If the trigger condition in block 802 is detected then in step 804 process controller 500 sends a telephone dial command message to the telecommunication apparatus 200. The telephone dial command consists of or is part of a predetermined message on the vehicle data bus containing a telephone number to be dialed. Telecommunication apparatus 200 is configured to receive the telephone dial command and responsive thereto establish voice and/or data communication through wireless network 102 and PSTN 104 with the desired telephone number. For emergency use in the United States the telephone number requested in step 804 will typically be "911" to establish communication with a PSAP.

As described earlier with respect to FIG. 2B and FIG. 2C emergency call apparatus 214 may be retrofitted into a vehicle 100 at some time after the vehicle has been built. In case of a retrofit telecommunication apparatus 200 may not haven been designed for use with the emergency call apparatus 214. In particular, telecommunication apparatus 200 may not have been configured to receive a telephone dial command message on vehicle data bus 212 that is originating from emergency call apparatus 214. Telecommunication apparatus 200 may however have been configured to receive telephone dial command messages on vehicle data bus 212 that are originating from other devices, for example navigation system 218. To operate under these circumstances emergency call apparatus 214 may be configured to mimic the telephone dial command message originating e.g. from navigation system 218. To mimic the dial command message emergency call apparatus 214 uses the same message identifier segment that has been assigned to navigation system 218 when transmitting its telephone dial command message. By sharing the same message identifier segment a telephone dial command message originating from emergency call apparatus 214 and a telephone dial command message originating from navigation system 218 become indistinguishable for the telecommunication apparatus 200. Telecommunication apparatus 200 hence responds properly to a telephone dial command message originating from emergency call apparatus 214 even though it may not have been designed for this purpose. While emergency call apparatus 214 shares the same message identifier segment with navigation system 218 it should be understood that vehicle 100 need not necessarily be equipped with navigation system 218. It is sufficient if telecommunication apparatus 200 is configured to respond to telephone dial command messages on the vehicle data 212 bus irrespective of whether the potential transmitter of such a message is actually present in the vehicle.

Table 1 illustrates the structure of an exemplary vehicle data bus message. As illustrated the message consist of an identifier segment, which in case of CAN messages may e.g. be 11 or 29 bits long, and a data segment carrying the message payload, which may be up to 8 bytes long. To avoid message collision vehicle communication networks usually use unique identifier segments for each transmitting module, if the same message is originating from more than one module. Modules connected to the communication network are configured to respond to predetermined messages which are distinguished from other messages by their identifier segments.

TABLE 1

| Identifier Segment 11 bit or 29 bit | | Data Segment 0 to 8 bytes | | | | | |
|---|---|---|---|---|---|---|---|
| Example 0x0CF00400 | 39 | 31 | 31 | 23 | FF | FF | FF | FF |

To avoid the unlikely but possible collision of two telephone dial command messages issued simultaneously by both the navigation system 218 and the emergency call apparatus 214 the emergency call apparatus 214 may in a vehicle communication system configuration 400 actively prevent such collision. Accordingly control processor 500 in an embodiment as shown in FIG. 6 may in a first step open switch 606 so that the navigation system 218 is no longer connected to the telecommunication apparatus 200 before control processor 500 in a second step transmits its telephone dial command message to the telecommunication apparatus 200. Control processor 500 in an embodiment as shown in FIG. 7 may selectively suppress forwarding a telephone dial command received from the navigation system 218 through vehicle data bus interface 700 while transmitting its own telephone dial command through vehicle data bus interface 504.

Figure 9:
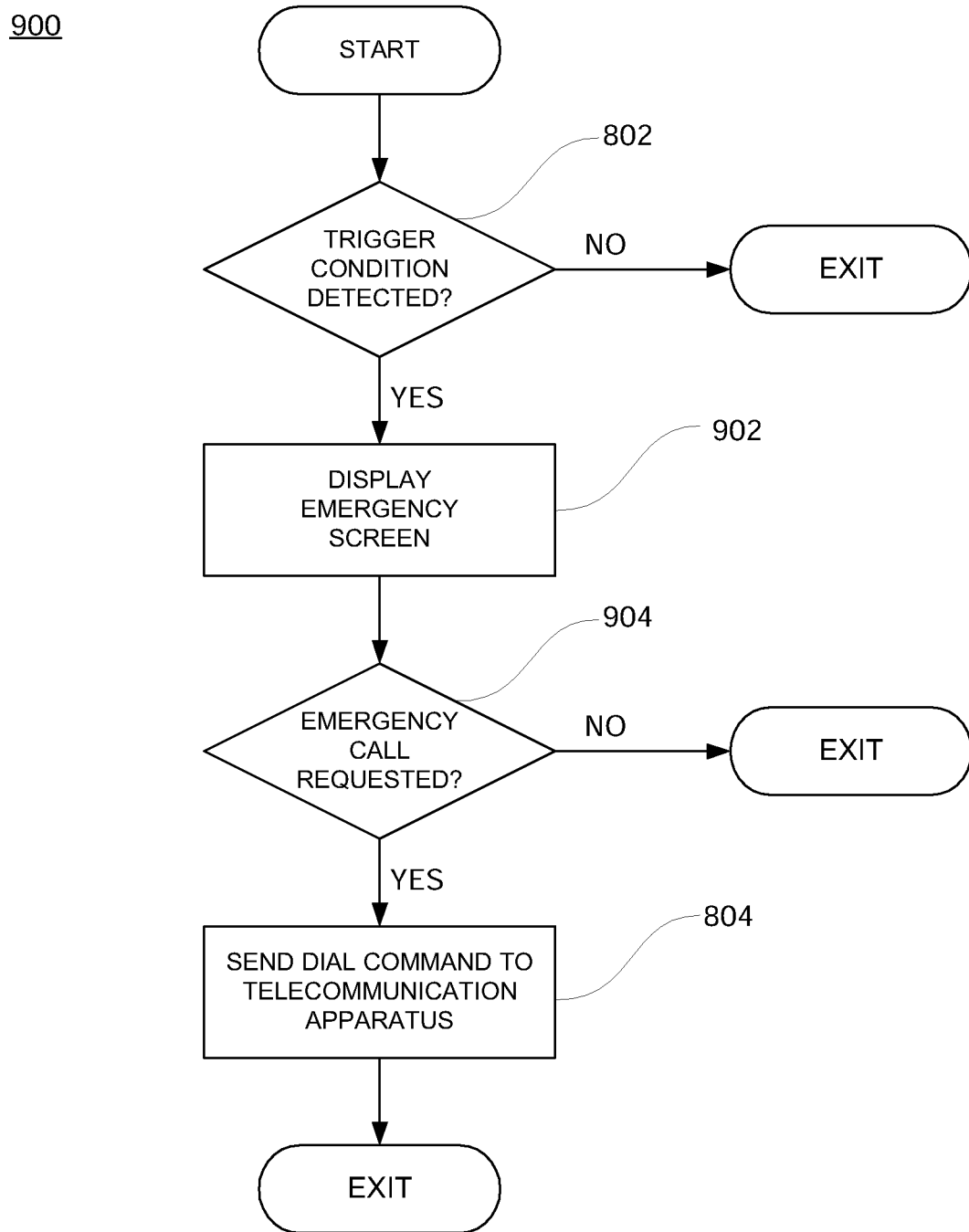
FIG. 9 is a flow diagram illustrating an alternative embodiment of the method shown in FIG. 8.

FIG. 9 is a flow diagram showing an alternative exemplary embodiment of the method illustrated in FIG. 8. This embodiment is suitable for example for vehicles in which the emergency call apparatus 214 is integrated with the navigation system 218 and where the navigation system 218 is connected to a display. If in step 802 a trigger condition, e.g. an airbag deployment, is detected the emergency call apparatus displays or causes to be displayed an emergency screen 1000 comprising a prominent user interface to activate an emergency call. If in step 904 an emergency call is requested the emergency call apparatus in step 804 sends a telephone dial command to telecommunication apparatus 200.

Figure 10:
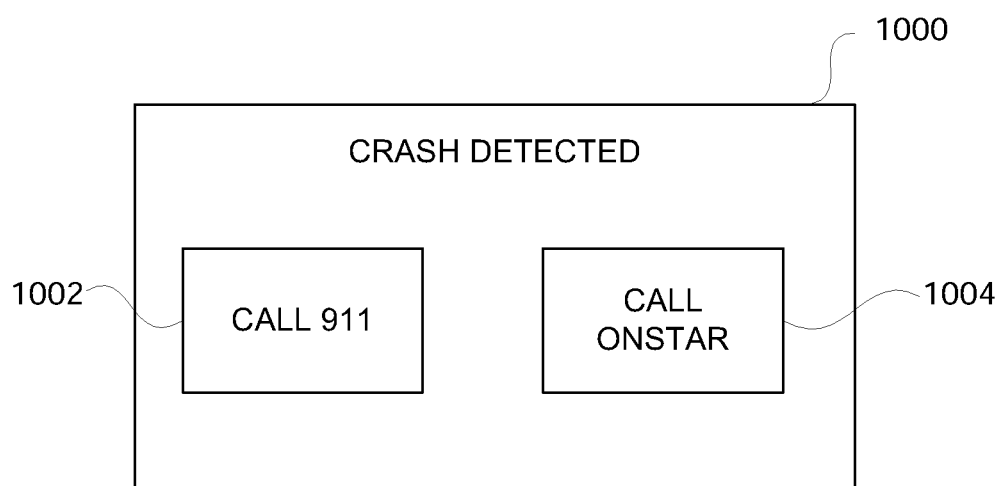
FIG. 10 is a schematic diagram of an exemplary touch screen display.

Finally, an exemplary emergency screen 1000 as may e.g. be used within a touch screen navigation display is shown in FIG. 10. Emergency screen 1000 comprises virtual button 1002 to call PSAP 106 and virtual button 1004 to call service center 108.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method, comprising:
   providing a retrofit apparatus for installation in an existing vehicle, the retrofit apparatus comprising
      a control processor,
      a first CAN bus terminal for electrically connecting the retrofit apparatus to a first factory-installed apparatus, a second CAN bus terminal for electrically connecting the retrofit apparatus to a second factory-installed apparatus, and a switch operatively connected to and controlled by the control processor, the switch being configured to selectively connect the first CAN bus terminal to the second CAN bus terminal;

causing an original CAN bus message originating in the second factory-installed apparatus to reach the first factory-installed apparatus by closing the switch to connect the first CAN bus terminal to the second CAN bus terminal;

causing the original CAN bus message originating in the second factory-installed apparatus to not reach the first factory-installed apparatus by opening the switch to disconnect the first CAN bus terminal from the second CAN bus terminal; and transmitting a mimicked CAN bus message from the retrofit apparatus to the first factory-installed apparatus.

2. The method as in claim 1, wherein the switch is an electromechanical relay, and wherein the electromechanical relay is normally closed, thereby electrically connecting the first CAN bus terminal to the second CAN bus terminal when the retrofit apparatus is not powered.

3. The method as in claim 1, wherein the mimicked CAN bus message is indistinguishable to the factory-installed first apparatus from the original CAN bus message originating in the second factory-installed apparatus.

4. The method as in claim 1, further comprising providing a network termination resistor that is electrically connected to the first CAN bus terminal.

5. The method as in claim 1, further comprising:

preventing a message collision between the original CAN bus message and the mimicked CAN bus message.

6. The method as in claim 1, wherein transmitting the mimicked CAN bus message is performed after opening the switch, thereby preventing a message collision between the original CAN bus message and the mimicked CAN bus message.

7. The method as in claim 1, further comprising installing the retrofit apparatus in the existing vehicle between the first factory-installed apparatus and the second factory-installed apparatus.

8. The method as in claim 1, wherein opening the switch causes a vehicle CAN bus to be separated into two subnets.

9. A method, comprising:

providing a retrofit apparatus for installation in a vehicle, the retrofit apparatus comprising a control processor, a first CAN bus terminal for electrically connecting the retrofit apparatus to a first factory-installed apparatus, a second CAN bus terminal for electrically connecting the retrofit apparatus to a second factory-installed apparatus, and a switch operatively connected to and controlled by the control processor, the switch being configured to selectively connect the first CAN bus terminal to the second CAN bus terminal; and dividing a vehicle CAN bus into two subnets by opening the switch, wherein a first of the two subnets connects the first factory-installed apparatus to the retrofit apparatus through the first CAN bus terminal, and wherein a second of the two subnets connects the second factory-installed apparatus to the retrofit apparatus through the second CAN bus terminal.

10. The method as in claim 9, wherein dividing the vehicle CAN bus into the two subnets includes separating the first factory-installed apparatus from a rest of the vehicle.

11. The method as in claim 10, further comprising:

communicating, on the first of the two subnets, between the retrofit apparatus and the first factory-installed apparatus; and communicating, on the second of the two subnets, between the retrofit apparatus and the rest of the vehicle.

12. The method as in claim 9, wherein the switch is a normally closed electromechanical relay.

13. The method as in claim 9, further comprising:

transmitting a mimicked CAN bus message from the retrofit apparatus on one of the two subnets, the mimicked CAN bus message sharing a common CAN identifier with an original CAN bus message transmitted on another of the two subnets.

14. The method as in claim 13, further comprising detecting a trigger condition, and transmitting the mimicked CAN bus message in response to detecting the trigger condition.

15. The method as in claim 13, wherein transmitting the mimicked CAN bus message is performed only after separating the vehicle CAN bus into the two subnets.

16. A method, comprising:

installing a retrofit apparatus in an existing vehicle, the existing vehicle comprising a vehicle CAN bus, and a plurality of factory-installed apparatuses connected to the vehicle CAN bus;

selectively dividing the vehicle CAN bus into two electrically insulated subnets, a first of the two electrically insulated subnets being connected to the retrofit apparatus by a first CAN bus terminal and a second of the two electrically insulated subnets being connected to the retrofit apparatus by a second CAN bus terminal; and transmitting a mimicked CAN bus message from the retrofit apparatus on one of the two electrically insulated subnets, the mimicked CAN bus message sharing a common CAN identifier with an original CAN bus message transmitted by one of the plurality of factory-installed apparatuses on another of the two electrically insulated subnets.

17. The method as in claim 16, wherein selectively dividing the vehicle CAN bus into the two electrically insulated subnets includes separating one of the plurality of factory-installed apparatuses from a rest of the factory-installed apparatuses by opening a switch within the retrofit apparatus that selectively connects the first CAN bus terminal to the second CAN bus terminal.

18. The method as in claim 17, wherein transmitting the mimicked CAN bus message is performed only after dividing the vehicle CAN bus into the two electrically insulated subnets.

19. The method as in claim 18,
wherein opening the switch within the retrofit apparatus includes controlling an electromechanical relay by a control processor.

20. The method as in claim 19,
wherein dividing the vehicle CAN bus into the two electrically insulated subnets prevents a message collision between the mimicked CAN bus message and the original CAN bus message.

* * * * *